US009559549B2

(12) United States Patent
Murayama et al.

(10) Patent No.: US 9,559,549 B2
(45) Date of Patent: Jan. 31, 2017

(54) ENERGY MANAGEMENT SERVER, ENERGY MANAGEMENT METHOD, AND PROGRAM

(71) Applicant: KABUSHIKI KAISHA TOSHIBA, Minato-ku (JP)

(72) Inventors: Dai Murayama, Musashino (JP); Masaaki Saito, Tokyo (JP); Nagako Hisada, Koganei (JP); Yutaka Iino, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 356 days.

(21) Appl. No.: 14/448,654

(22) Filed: Jul. 31, 2014

(65) Prior Publication Data

US 2015/0019036 A1    Jan. 15, 2015

Related U.S. Application Data

(63) Continuation of application No. PCT/JP2014/067202, filed on Jun. 27, 2014.

(30) Foreign Application Priority Data

Jul. 2, 2013   (JP) ................................ 2013-139030

(51) Int. Cl.
    *G01R 21/133*       (2006.01)
    *G05F 1/66*         (2006.01)
    (Continued)

(52) U.S. Cl.
    CPC ............ *H02J 13/0006* (2013.01); *H02J 3/382* (2013.01); *H02J 3/383* (2013.01); *H02J 3/386* (2013.01);
    (Continued)

(58) Field of Classification Search
    CPC ........ H02J 13/0006; H02J 3/382; H02J 3/383; H02J 3/386; Y02B 10/14; Y02B 70/3216; Y02B 70/3266; Y02E 10/563; Y02E 10/763; Y02E 40/72; Y04S 10/123; Y04S 20/242; Y04S 20/221; Y02P 80/11

See application file for complete search history.

(56) References Cited

U.S. PATENT DOCUMENTS 6,774,506 B2 *  8/2004  Hashimoto ............... H02J 3/14
                                                      307/38
8,612,062 B2 * 12/2013  Iino ......................... H02J 3/14
                                                      700/22

(Continued)

FOREIGN PATENT DOCUMENTS

CN     102592246 A     7/2012
CN     103403465 A    11/2013
(Continued)

OTHER PUBLICATIONS

International Search Report issued on Aug. 26, 2014 in PCT/JP2014/067202 (English Translation).

(Continued)

*Primary Examiner* — Ramesh Patel
(74) *Attorney, Agent, or Firm* — Oblon, McClelland, Maier & Neustadt, L.L.P.

(57) ABSTRACT

According to an embodiment, management server includes estimator, scheduler, acquisition unit, monitoring unit, receiver and setting unit. Estimator calculates estimated value of energy demand in building with electric appliance. Scheduler creates schedule of appliance based on estimated value. Acquisition unit acquires actual value of energy demand. Monitoring unit monitors error between estimated value and actual value. Receiver receives DR signal containing information which prompts suppression of energy consumption in a designated period. Setting unit sets threshold. Estimator recalculates estimated value if error is equal (Continued)

or more than threshold. Scheduler reforms schedule based on the recalculated estimated value.

15 Claims, 11 Drawing Sheets

(51) Int. Cl.
*H02J 13/00* (2006.01)
*H02J 3/38* (2006.01)

(52) U.S. Cl.
CPC ............ *Y02B 10/14* (2013.01); *Y02B 70/3216* (2013.01); *Y02B 70/3266* (2013.01); *Y02E 10/563* (2013.01); *Y02E 10/763* (2013.01); *Y02E 40/72* (2013.01); *Y02P 80/11* (2015.11); *Y04S 10/123* (2013.01); *Y04S 20/221* (2013.01); *Y04S 20/242* (2013.01)

(56) References Cited

U.S. PATENT DOCUMENTS

| | | | | |
|---|---|---|---|---|
| 8,989,911 | B2* | 3/2015 | Murai | G06Q 10/06 700/291 |
| 9,136,706 | B2* | 9/2015 | Mitsumoto | H02J 3/00 |
| 9,335,747 | B2* | 5/2016 | Steven | G06Q 10/00 |
| 2010/0179704 | A1* | 7/2010 | Ozog | G06Q 10/06315 700/291 |
| 2011/0270459 | A1* | 11/2011 | Murai | G06Q 10/06 700/295 |
| 2012/0136496 | A1 | 5/2012 | Black et al. | |
| 2013/0144451 | A1 | 6/2013 | Kumar et al. | |
| 2013/0173075 | A1* | 7/2013 | Mitsumoto | H02J 3/00 700/291 |
| 2013/0311236 | A1* | 11/2013 | Takahashi | G06Q 10/06 705/7.31 |
| 2014/0039965 | A1* | 2/2014 | Steven | G06Q 10/06315 705/7.25 |
| 2014/0067142 | A1* | 3/2014 | Steven | G06Q 10/00 700/291 |
| 2014/0094980 | A1 | 4/2014 | Saito et al. | |
| 2014/0163757 | A1* | 6/2014 | Murayama | G05B 15/02 700/291 |
| 2014/0188295 | A1* | 7/2014 | Saito | G06Q 50/06 700/291 |

FOREIGN PATENT DOCUMENTS

| | | | |
|---|---|---|---|
| JP | 2001-327075 | 11/2001 | |
| JP | 2005-157685 | 6/2005 | |
| JP | 4396557 | 10/2009 | |
| JP | 2011-2929 | 1/2011 | |
| JP | 2011-248461 | 12/2011 | |
| JP | 2013-174412 | 9/2013 | |
| JP | 2014-96946 | 5/2014 | |
| JP | 2015-18374 A | 1/2015 | |
| JP | WO 2015002092 A1 * | 1/2015 | ......... H02J 13/0006 |
| JP | 2015-56104 A | 3/2015 | |
| JP | 2015-228128 A | 12/2015 | |
| JP | 2016-8725 A | 1/2016 | |
| WO | WO 2012-120623 A1 | 9/2012 | |
| WO | WO 2013/042363 A1 | 3/2013 | |

OTHER PUBLICATIONS

Combined Chinese Office Action and Search Report issued Mar. 29, 2016 in Patent Application No. 201480000680.5 (with English language translation).

Search Report and Written Opinion issued on Jul. 24, 2015 in Singapore Patent Application No. 11201404593S.

International Search Report and Written Opinion issued Aug. 26, 2014, in International Application No. PCT/JP2014/067202 (with English translation of Category of Cited Documents).

* cited by examiner

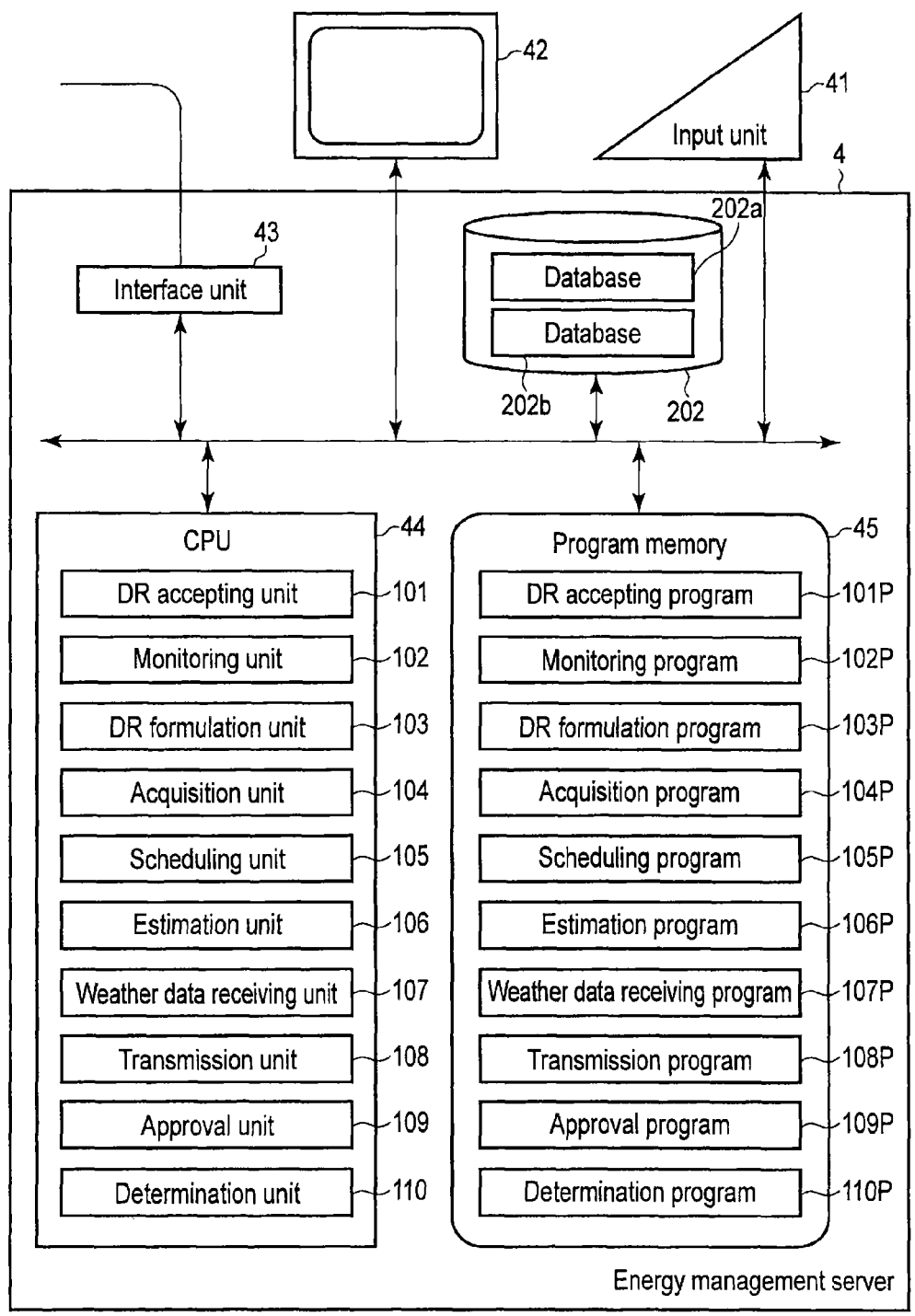
F I G. 3

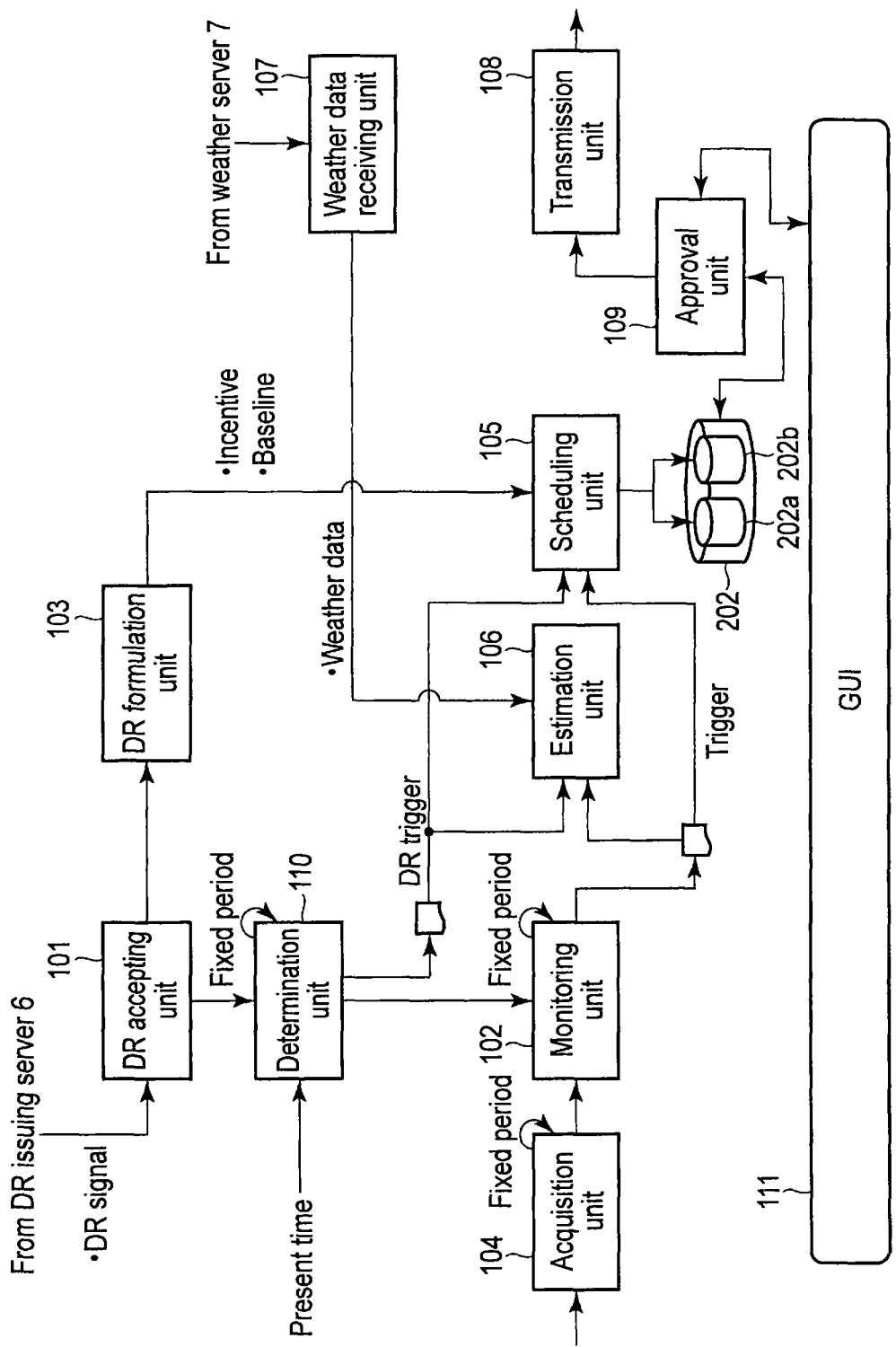
F I G. 4

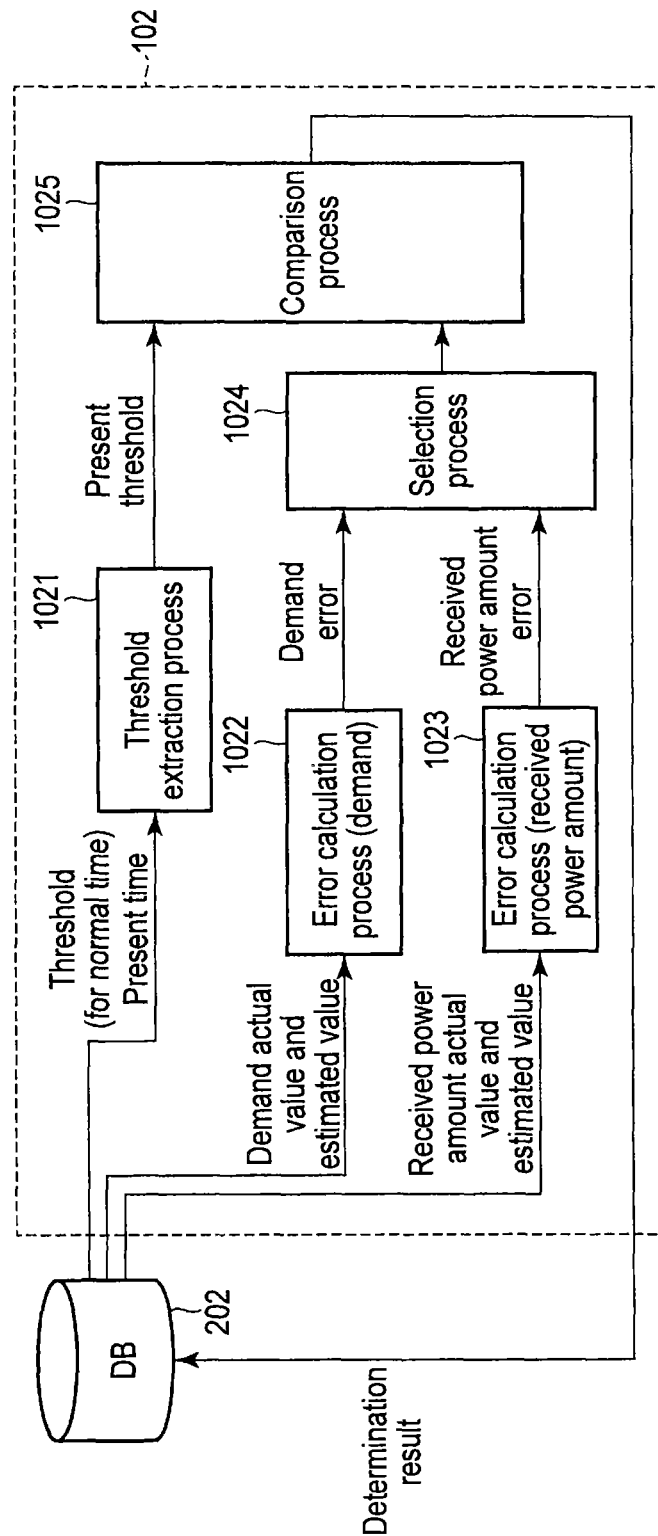
F I G. 6

Estimated Error Determination Threshold Setting Window

■ Threshold (for normal time)   Unit [kW]

| 0:00 | 0:30 | 1:00 | ... | 11:00 | ... | 21:30 | 22:00 | 22:30 | 23:00 | 23:30 |
|------|------|------|-----|-------|-----|-------|-------|-------|-------|-------|
| 100  | 100  | 100  | ... | 20    | ... | 100   | 100   | 100   | 100   | 100   |

Set

■ Threshold (when DR signal exists)   Unit [kW]

| 0:00 | 0:30 | 1:00 | ... | 11:00 | ... | 12:30 | 13:00 | ... | 23:00 | 23:30 |
|------|------|------|-----|-------|-----|-------|-------|-----|-------|-------|
| 100  | 100  | 100  | ... | 20    | ... | 40    | 40    | ... | 100   | 100   |

Set

■ Determination target
  ⊙ Received power amount error
  ○ Demand

※Set threshold for each period and press button

F I G. 8

Pp1=Pp0+△P₁₁
(Estimated error at 11:00  △P₁₁=Pp0₁₁-Pp1₁₁)

US 9,559,549 B2

ENERGY MANAGEMENT SERVER, ENERGY MANAGEMENT METHOD, AND PROGRAM

CROSS-REFERENCE TO RELATED APPLICATION

This application is a Continuation application of PCT Application No. PCT/JP2014/067202, filed Jun. 27, 2014 and based upon and claiming the benefit of priority from prior Japanese Patent Application No. 2013-139030, filed Jul. 2, 2013, the entire contents of all of which are incorporated herein by reference.

FIELD

Embodiments described herein relate generally to an energy management server, energy management method, and program applicable to energy management in relatively large-scale structures such as buildings and factories.

BACKGROUND

Buildings and factories consume large amounts of energy. The energy consumption amount of the commercial sector is particularly large and probably reaches 20% of the whole. Therefore, effective energy-saving measures are required in buildings. Also, the recent increasing severity in power demand and supply has caused upper limits to be placed on the power consumption of large users (customers). Accordingly, energy-saving techniques such as peak cutting and peak shifting to reduce energy consumption are attracting attention.

Energy-related apparatuses include various apparatuses such as an energy-consuming apparatus, energy-creating apparatus, and energy-storing apparatus. To effectively use energy, it is important to make these energy-related apparatuses cooperate with each other. For example, it is important to create an all-inclusive operation schedule to operate the energy-related apparatuses.

There is a proposal for determining an operation schedule capable of minimizing the energy consumption amount, cost, and $CO_2$ generation amount in a predetermined period of an energy supply facility including a heat storage tank. Another proposal for increasing the overall energy efficiency of a building involves making an apparatus using renewable energy (e.g., a PV (PhotoVoltaic) system or solar water heater) cooperate with a storage battery, a heat storage device, or an existing electric apparatus.

A technique called demand response, by which an energy supplier requests a customer to suppress energy consumption, is also known. When a building or factory receives a DR (Demand Response) signal, an energy-saving target value, power-saving target value, or the like is changed, and an operation schedule is also changed accordingly. A measure for when a structure such as a building or factory has received the DR (Demand Response) signal is presently being examined. Related techniques have been applied as patents.

To timely execute an accurate operation schedule, it is desirable to reexamine an estimated demand immediately after the DR signal is received, and re-plan the operation schedule as needed. However, no technique for practically implementing the processing as described above is known.

BRIEF DESCRIPTION OF THE DRAWINGS

FIG. 3 is a functional block diagram showing an example of an energy management server 4;

FIG. 4 is a view for explaining the relationship between functional blocks shown in FIG. 3;

FIG. 6 is a view showing an example of the relationship between processes in a monitoring unit 102;

FIG. 8 is a view showing an example of a window displayed in a GUI 111 and used to set an estimated error determination threshold;

DETAILED DESCRIPTION

In general, according to an embodiment, an energy management server includes an estimation unit, scheduler, acquisition unit, monitoring unit, receiving unit, and setting unit. The estimation unit calculates an estimated value of an energy demand in a building in which an electric appliance is installed. The scheduler creates an operation schedule of the electric appliance based on the estimated value. The acquisition unit acquires an actual value of the energy demand. The monitoring unit monitors an error between the estimated value and actual value. The receiving unit receives a demand response signal containing information which prompts the suppression of energy consumption in a designated period. The setting unit sets a threshold related to the demand response signal. The estimation unit recalculates the estimated value if the error is equal to or larger than a defined threshold. The scheduler reforms the operation schedule based on the recalculated estimated value.

Figure 1:
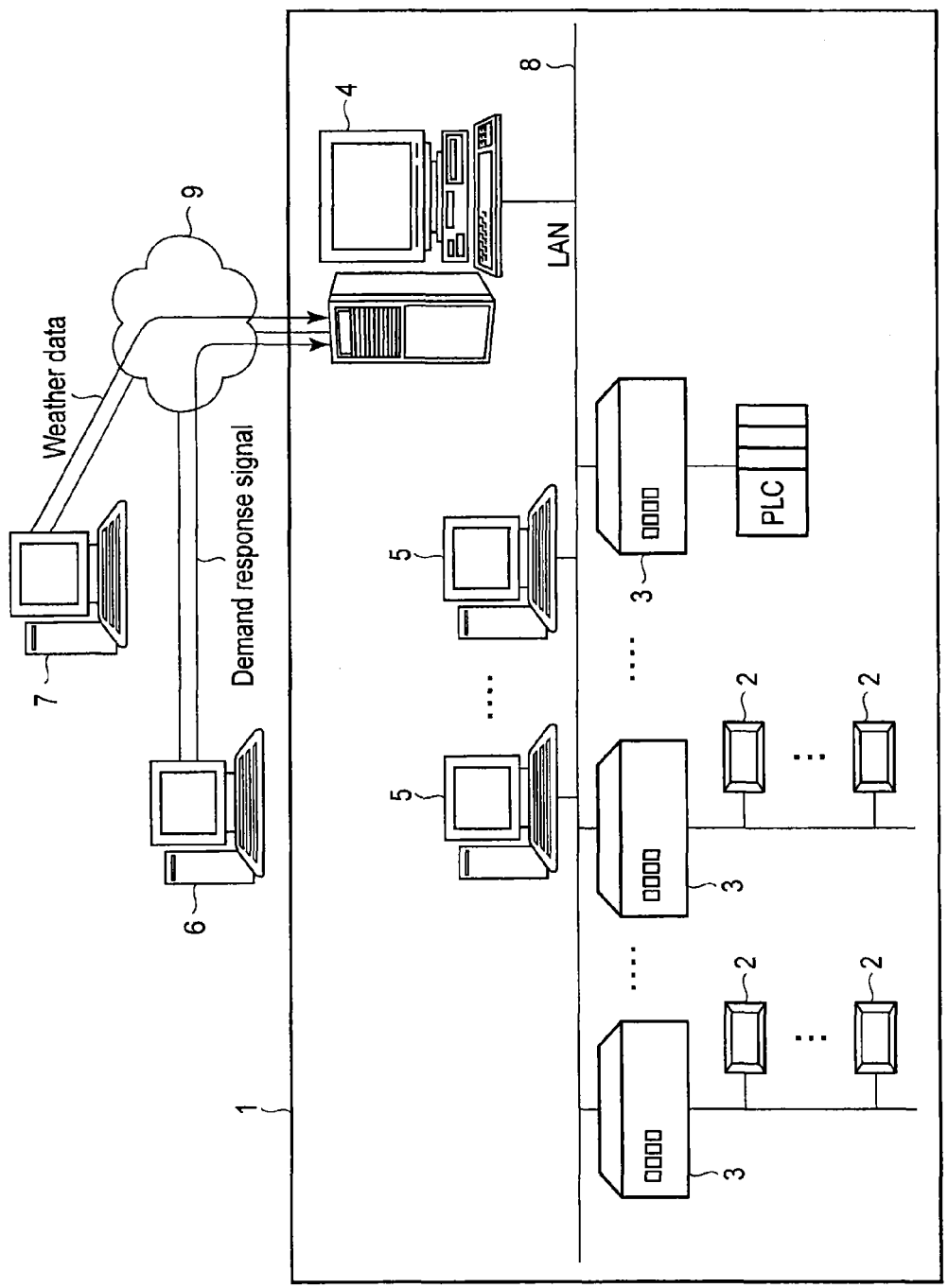
FIG. 1 is a system view showing an example of an energy management system according to an embodiment.

FIG. 1 is a system view showing an example of an energy management system according to an embodiment. A building 1 shown in FIG. 1 includes a LAN (Local Area Network) 8, and monitoring apparatuses 5, local controllers 3, and an energy management server 4 connected to the LAN 8. As an upper-layer protocol of the LAN 8, it is possible to use, e.g., BACnet.

A plurality of nodes 2 are connected to the local controllers 3 via their respective communication lines. Each local controller 3 monitors the states of the nodes 2 connected to it, and performs various kinds of control over the nodes 2 connected to it. Each node 2 can be an energy-consuming apparatus, energy-creating apparatus, or energy-storing apparatus. For example, the node 2 is an air-conditioning apparatus, illumination apparatus, motive power apparatus, heat source apparatus, heat storage apparatus, chiller, PV system, storage battery, or the like. In the following description, these apparatuses will collectively be called electric appliances. Each monitoring apparatus 5 is an HMI (Human-Machine Interface) which acts as an information transmission interface between the user (e.g., the building manager) and the system.

The energy management server 4 can be connected to a cloud computing system (to be referred to as a cloud hereinafter) 9. The energy management server 4 receives a DR (Demand Response) signal from a DR issuing server 6 of the cloud 9, and acquires weather data (e.g., weather forecast and the temperature in each period) from a weather server 7 of the cloud 9. The cloud 9 is an arithmetic processing system in which a plurality of servers and a plurality of databases are connected to an IP (Internet Protocol) network or dedicated network. The cloud 9 is implemented in the form of, e.g., a data center.

The main function of the energy management server 4 is a function of managing the energy of the building 1. In the embodiment, an electric appliance operation schedule creating function of the energy management server 4 will mainly be explained. Examples of the operation schedule are an activation/stop schedule of the nodes 2 based on a request (e.g., a peak-shift target) from the user, and an electricity storage/heat storage schedule based on electricity storage level settings.

Figure 2:
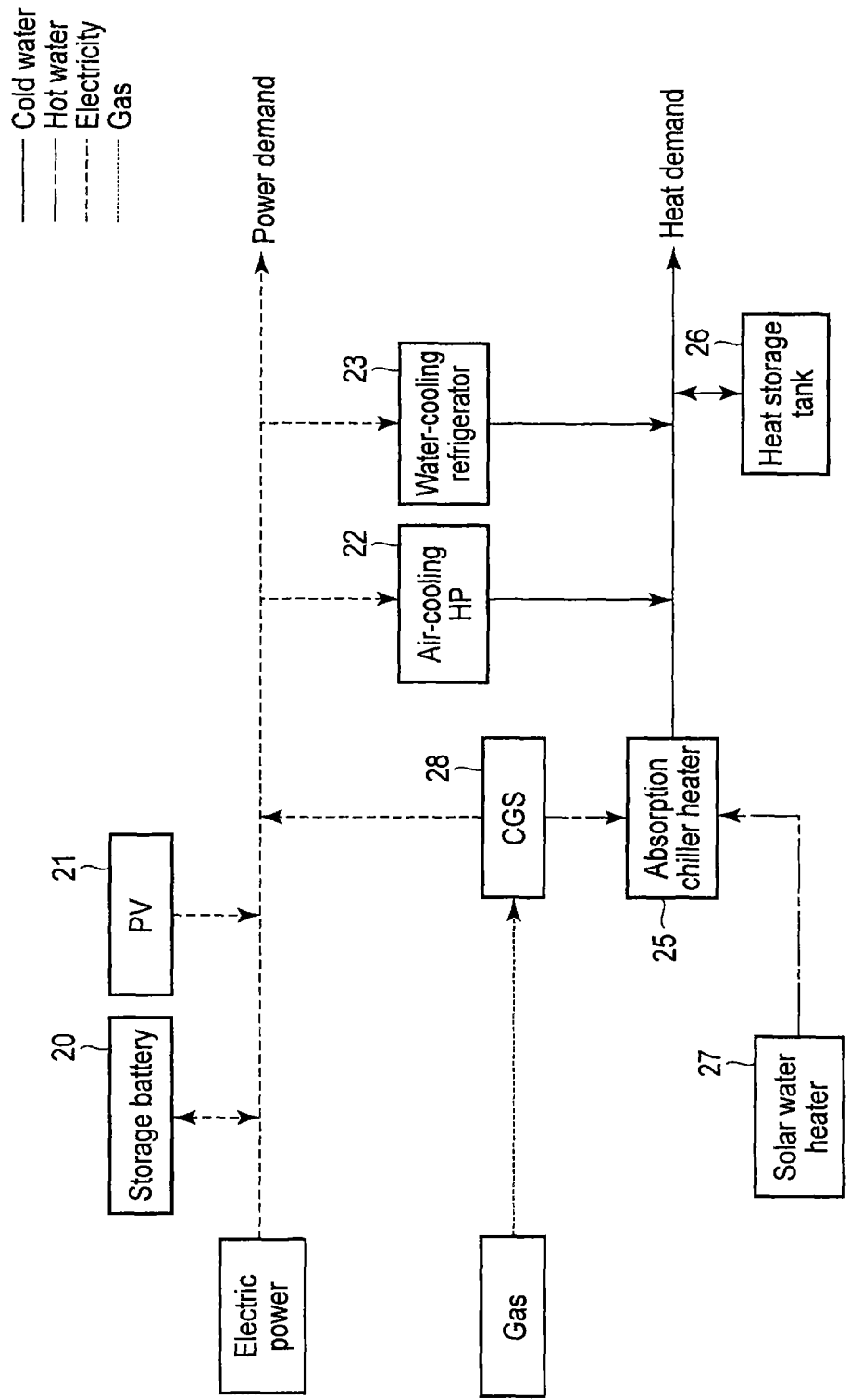
FIG. 2 is a view showing an example of the flow of energy in a building 1.

FIG. 2 is a view showing an example of the flow of energy in the building 1. In the following description, storage battery 20, PV system 21, air-cooling HP (Heat Pump) 22, water-cooling chiller 23, absorption chiller heater 25, heat storage tank 26, solar water heater 27, and CGS (Co-Generation System) 28 will be enumerated as examples of the nodes 2. The energy exchange relationship between these appliances will be explained below with reference to FIG. 2.

Electric power and a gas are supplied to the building 1, and electricity and cold heat using the electric power and gas as energy sources are supplied to various places in the building 1. The received power is supplied to the storage battery 20 and stored in it, or supplied to an energy-consuming apparatus and consumed in it. Similarly, electric power generated by the PV system 21 and CGS 28 is stored in the storage battery 20 or supplied to an energy-consuming apparatus. For example, electric power supplied to the air-cooling HP 22 or water-cooling chiller 23 is consumed to manufacture cold heat.

The gas supplied to the building 1 is supplied to the CGS 28. The CGS 28 generates electric power and hot heat. The generated electric power is supplied to a power line. The generated hot heat is supplied to a hot-water line.

The absorption chiller heater 25 receives the hot heat generated by the CGS 28 and solar water heater 27, and manufactures cold heat. The cold heat manufactured by the air-cooling HP 22, water-cooling chiller 23, and absorption chiller heater 25 is consumed by a heat demand or stored in the heat storage tank 26.

FIG. 3 is a functional block diagram showing an example of the energy management server 4. The energy management server 4 includes an input unit 41, display 42, interface unit 43, database unit 202, CPU (Central Processing Unit) 44, and program memory 45. That is, the energy management server 4 is a computer which functions when the CPU 44 executes programs stored in the program memory 45.

The input unit 41 is a human-machine interface such as an operation panel and switches. The input unit 41 and display 42 form a GUI (Graphical User Interface) environment, receive information input from the user, and provide information to the user. The interface unit 43 is connected to the LAN 8 and cloud 9, and communicates with the monitoring apparatuses 5, local controllers 3, nodes 2, and remote servers (e.g., the DR issuing server 6 and weather server 7).

The database unit 202 stores databases 202a and 202b as data according to the embodiment, in addition to various kinds of data concerning energy management.

The program memory 45 stores, as programs containing instructions necessary for processing functions according to this embodiment, a DR accepting program 101p, monitoring program 102p, DR formulation program 103p, acquisition program 104p, scheduling program 105p, estimation program 106p, weather data receiving program 107p, transmission program 108p, approval program 109p, and determination program 110p. These programs can be recorded on a removable medium (recording medium) such as a CD-ROM, and can also be downloaded via a communication line (including the cloud 9).

The CPU 44 reads out each program from the program memory 45, and performs arithmetic processing by hardware. As its processing functions, the CPU 44 includes a DR accepting unit 101, monitoring unit 102, DR formulation unit 103, acquisition unit 104, scheduling unit 105, estimation unit 106, weather data receiving unit 107, transmission unit 108, approval unit 109, and determination unit 110.

FIG. 4 is a view for explaining the relationship between the functional blocks shown in FIG. 3. The acquisition unit 104 collects the values of, e.g., the received power amount, power demand, and heat demand of the node 2 as a control target apparatus in, e.g., a predetermined period (fixed period). These values are real values (actual values) collectively called process values, and input from the acquisition unit 104 to the monitoring unit 102.

The monitoring unit 102 monitors the process values transferred from the acquisition unit 104, and, based on the values, forms a trigger for demand estimation and scheduling in, e.g., a fixed period. The formed trigger is given to the estimation unit 106 and scheduling unit 105.

The estimation unit 106 estimates the power demand and heat demand in the building 1 for, e.g., every 30 min. These values as estimation targets will collectively be called energy demands in the following description. The estimation process by the estimation unit 106 is performed as a periodic routine, and is also performed when a trigger is given from the monitoring unit 102.

When performing the estimation process, the estimation unit 106 uses weather data (e.g., weather forecast) received by the weather data receiving unit 107. The weather data receiving unit 107 regularly or irregularly acquires weather data from the weather server 7 of a weather forecast company.

The scheduling unit 105 creates an operation schedule of the node 2, which can optimize the energy balance in the building 1, based on the estimated values of the power demand and heat demand. The created operation schedule is stored in the database 202a. The operation schedule can contain, e.g., the operation settings, operation time, and operation period of each node 2. As the viewpoints of optimization, viewpoints such as energy saving, cost saving, and exhaust $CO_2$ reduction are possible. In addition, various other viewpoints of optimization are possible.

The DR accepting unit 101 receives a DR signal transmitted from the DR issuing server 6. The DR signal contains information such as the type of the DR signal, a period for requesting the suppression of power consumption, incentive, and the baseline of the power consumption amount. The determination unit 110 determines whether to respond to the DR signal at the present point in time, based on the output from the DR accepting unit 101 and the present time. For example, if it is determined to respond to the DR signal immediately after the signal is received, the determination unit 110 outputs a DR trigger. This DR trigger is given to the estimation unit 106 and scheduling unit 105, and triggers off the creation of an operation schedule based on the received DR signal.

The DR formulation unit 103 formulates the information contained in the received DR signal into a numerical expression usable in arithmetic processing. For example, a PTR (Peak Time Rebate) type DR signal involves a rule by which an incentive corresponding to a reduction amount from the baseline of the received power amount in a designated period is paid to the user. Information contained in a DR signal of this kind can be formulated by the hourly power rate, hourly incentive, and hourly baseline.

Based on the formulated information, the scheduling unit 105 creates an operation schedule of each node 2 (an electric appliance) in a predetermined period (e.g., one day (24 hours)). The created operation schedule is stored in the database 202b of the database unit 202. That is, the operation schedule created by receiving the DR signal is stored in the database 202b and processed separately from an operation schedule (stored in the database 202a) created without taking the DR signal into account.

For example, an operation schedule aiming at cost saving can be created by minimizing an objective function C indicated by:

$$C = \Sigma \{k_i \times L_i - m_i \times (L_i - B_i) + n_i \times P_i\}$$

$$i = 1 \sim 24 \tag{1}$$

C: cost in operation period
ki: power rate at time i
Li: received power amount at time i
mi: incentive at time i
Bi: baseline at time i
ni: gas rate at time i
Pi: gas consumption amount at time i
i: elapsed time from zero hours (unit: hour)

According to equation (1), it is possible to reduce the total cost including the gas rate in addition to the power rate.

The approval unit 109 displays a plurality of operation schedules on a GUI 111, and urges the user to approve one of the operation schedules. The approved operation schedule is read out from the database 202a or 202b, and transferred to the transmission unit 108. The transmission unit 108 generates a control signal (appliance command value) based on the operation schedule transferred from the approval unit 109. The control signal is supplied from the interface unit 43 (FIG. 3) to the node 2 via the LAN 8 and local controller 3. This implements electric appliance operation control based on the operation schedule.

Figure 5:
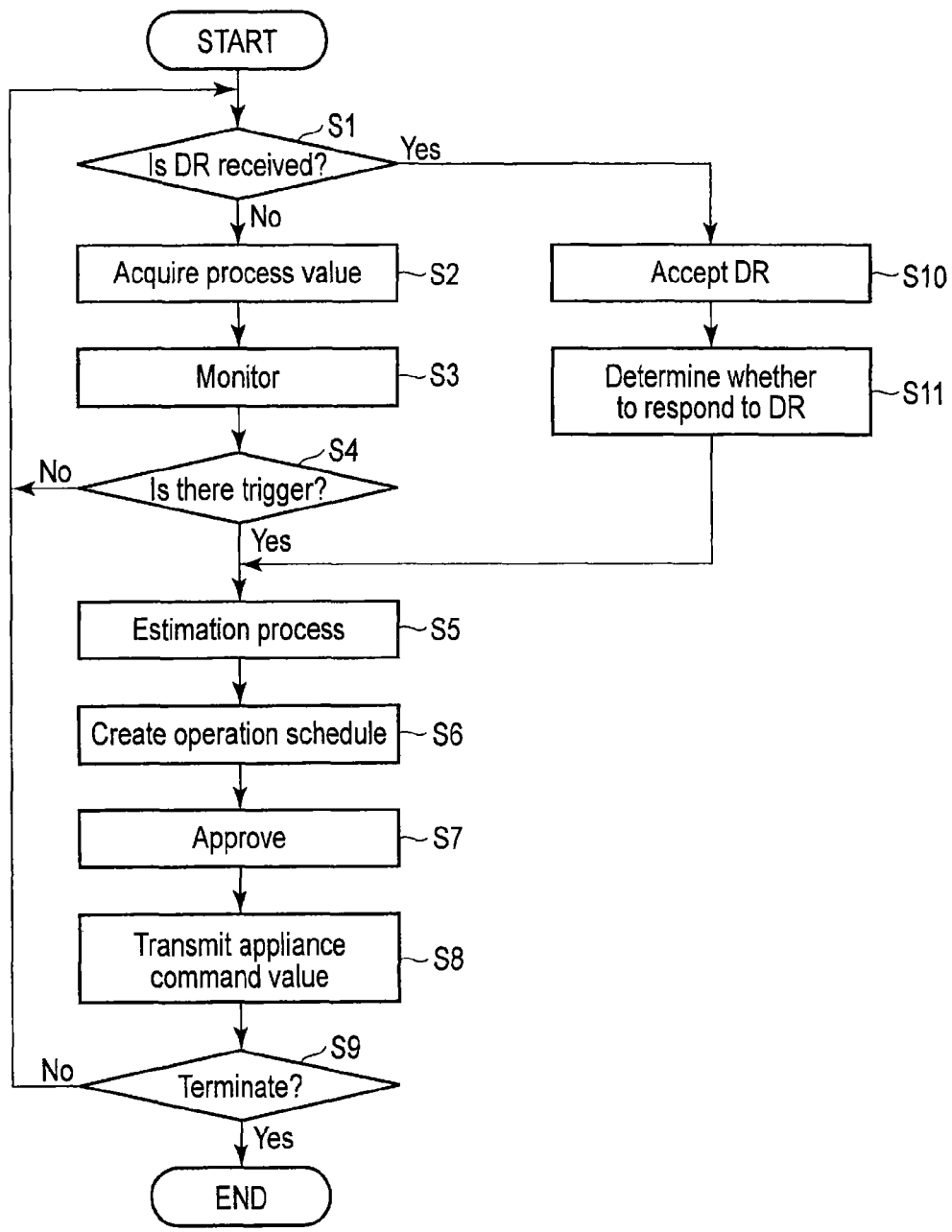
FIG. 5 is a flowchart showing an example of a procedure in the energy management server 4.

FIG. 5 is a flowchart showing an example of a procedure in the energy management server having the above-mentioned arrangement. The acquisition unit 104 monitors the arrival of a DR signal (step S1), and collects the process values such as the received power amount, power demand amount, and the heat demand amount of each node 2 (step S2). The monitoring unit 102 monitors the error (difference) between the process value and estimated value, and forms a trigger (to be referred to as a monitoring trigger hereinafter) if the error is equal to or larger than a defined threshold (step S3). If no monitoring trigger is formed (No in step S4), the procedure returns to step S1.

If the arrival of a DR signal is detected in step S1 (Yes), the DR accepting unit 101 executes a DR accepting process (step S10), and the determination unit 110 determines whether to respond to the accepted DR signal (step S11). If it is determined to respond to this DR signal, the determination unit 110 outputs a trigger (the DR trigger shown in FIG. 4) for creating an operation schedule corresponding to the DR signal.

If the monitoring trigger or DR trigger is generated, the estimation unit 106 executes a power demand/heat demand estimation process (step S5). The estimated demands are transferred to the scheduling unit 105, and an operation schedule for a predetermined period is created (step S6). The operation schedule is transferred to the approval unit 109. If this operation schedule is approved (step S7), the operation schedule is transferred to the transmission unit 108.

The transmission unit 108 generates an appliance command value based on the operation schedule, and transmits the generated appliance command value to the control target (step S8). The above procedure is repeated until termination is determined (Yes in step S9). In this flowchart shown in FIG. 5, an operation schedule corresponding to a DR signal can be executed immediately after the signal is received.

Figure 7:
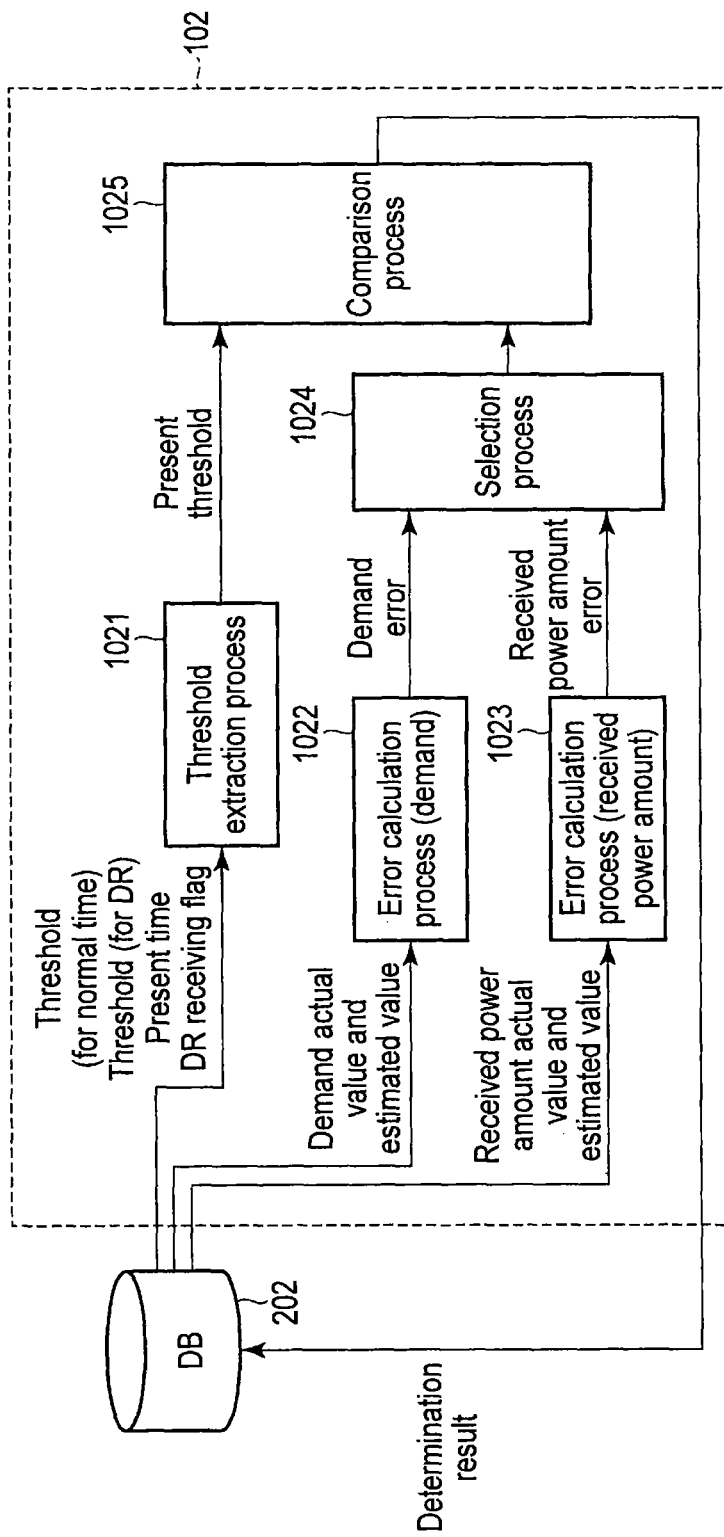
FIG. 7 is a view showing another example of the relationship between the processes in the monitoring unit 102.

FIGS. 6 and 7 show examples of the relationship between the processes in the monitoring unit 102. FIG. 6 corresponds to a case in which no DR signal exists. Referring to FIG. 6, a threshold extraction process 1021 acquires, from the database unit 202, the value at the present time of a threshold (for normal time) to be compared with the error between the process value and estimated value. That is, the threshold is a value which changes with time, and is set by, e.g., the user. Details of the threshold will be explained later with reference to FIG. 8.

An error calculation process 1022 calculates the error (demand error) between the actual value and estimated value of the power demand. An error calculation process 1023 calculates the error (received power amount error) between the actual value and estimated value of the received power amount. The demand error and received power amount error are transferred to a selection process 1024. The selection process 1024 selects one of these errors as a determination target, and transfers the selected error to a comparison process 1025. The comparison process 1025 compares the selected error with the present threshold, and stores a determination result indicating the magnitude relationship between them in the database unit 202.

FIG. 7 corresponds to a case in which a DR signal exists. Referring to FIG. 7, the threshold extraction process 1021 acquires, from the database unit 202, the value of a threshold (for DR) at the present time, and a DR receiving flag indicating that a DR signal is being received, in addition to the value of the threshold (for normal time) at the present time. The threshold extraction process 1021 outputs the threshold (for DR) while the DR signal is being received.

FIG. 8 is a view showing an example of a window displayed in the GUI 111 and used to set an estimated error determination threshold. That is, the GUI 111 functions as a setting unit for setting the threshold. Referring to FIG. 8, for example, the upper portion of the window shows a threshold input field for normal time, and the middle portion shows a threshold input field when a DR signal exists. Each threshold can be set for, e.g., every 30 min.

The user can determine the set value of the threshold based on, e.g., past experience using the window shown in FIG. 8. The lower portion of the window shows radio buttons for designating one of the received power amount and demand (electric power or heat) as a determination target. When values at individual times are input and the set button is clicked, the thresholds are set and stored in the database unit 202.

Figure 9:
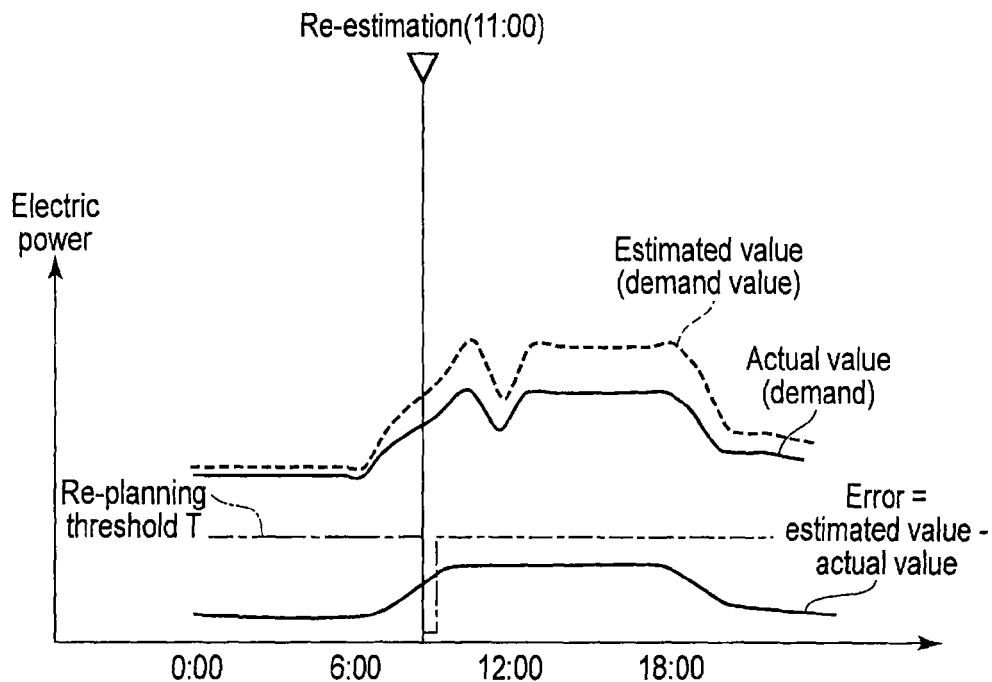
FIG. 9 is a view showing an example of the relationship between a re-planning threshold and estimated error with respect to a power demand.

FIG. 9 shows an example of the relationship between a re-planned value and estimated error with respect to the power demand. The one-dot dashed line shown in FIG. 9 indicates the change with time of a re-planning threshold T set by using the window shown in FIG. 8. In a period of 30 min from 11:00, the re-planning threshold T is set at a value much lower than that in other periods. In this period, a curve indicating the error as the difference between the estimated value and actual value is larger than the threshold T, so the monitoring unit 102 generates an estimation trigger.

This estimation trigger is input to the estimation unit 106 and scheduling unit 105. Consequently, a process of re-estimating the power demand or received power amount and a re-planning process accompanying this process are executed. FIG. 9 shows estimated values of one day estimated until the previous day, and actual values on the appointed day. For example, when the re-estimating process is executed at 11:00, the error between the estimated value and actual value becomes zero at that point in time. FIG. 9 need only be able to explain the generation of the estimation trigger, and hence does not show any details, for the sake of simplicity.

Figure 10:
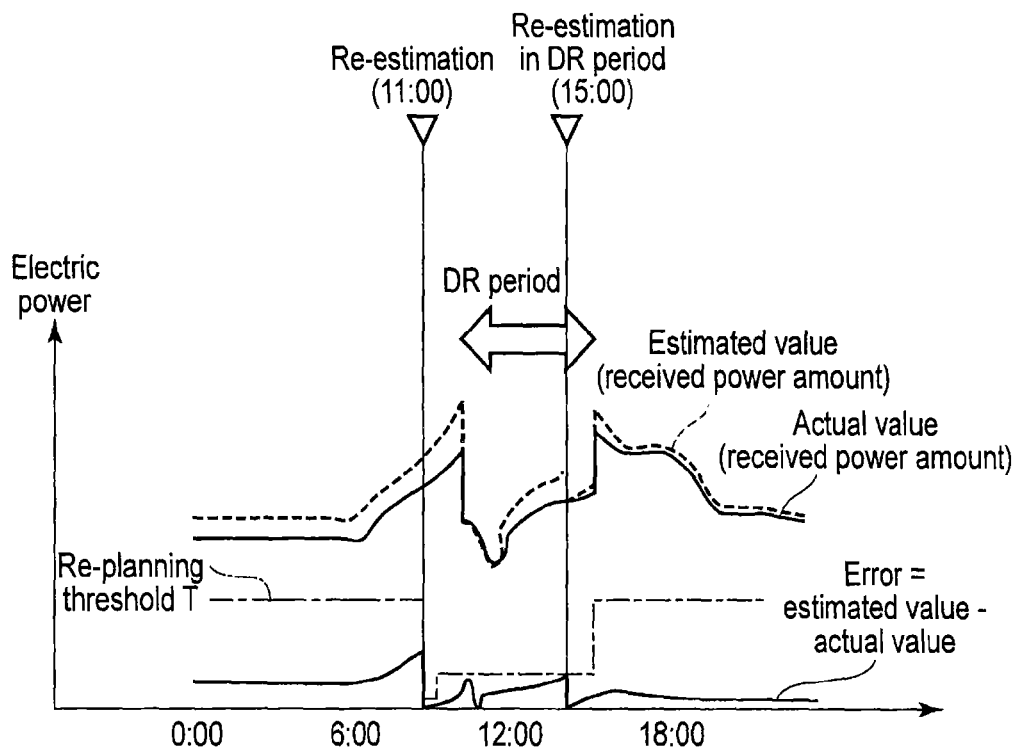
FIG. 10 is a view showing an example of the relationship between a re-planning threshold and estimated error with respect to a received power amount.

FIG. 10 is a view showing an example of the relationship between a re-planning threshold and estimated error with respect to the received power amount. FIG. 10 assumes that a DR signal exists. A DR period as a processing target is assumed to be 12:00 to 15:00. The re-planning threshold T is set at the lowest value from 11:00 to 11:30, at the second lowest value from 11:30 to 16:00, and a value higher than these values in other periods.

The error curve rises from about 6:00. On the other hand, since the threshold T becomes lowest at 11:00, the magnitude relationship between the error and threshold T is inverted. Therefore, the re-estimating process and re-planning process are activated at this point in time. As a consequence, the error becomes 0. After that, the DR period comes, and a power reducing operation corresponding to the demand response is started, thereby reducing the received power amount. The error changes in this DR period as well. For example, if the error exceeds the threshold at 15:00, the re-estimating process and re-planning process are activated even at this point in time.

When the DR period comes, the received power amount can be reduced by activating, e.g., the CGS 28 (FIG. 2). The received power amount can also be reduced by reducing the necessary power amount of the air-cooling HP 22 by manufacturing cold heat by the absorption chiller heater 25. However, FIG. 10 shows that the error starts increasing from about 14:00 and exceeds the re-planning threshold T at 15:00.

Accordingly, the error becomes 0 again by activating the re-estimating process and re-planning process during the DR period as well. By thus making the re-planning threshold T in the DR period lower than those in other periods, re-estimation and re-planning can be performed even in the DR period. Also, re-planning can be performed under stricter conditions during the DR period.

Figure 11:
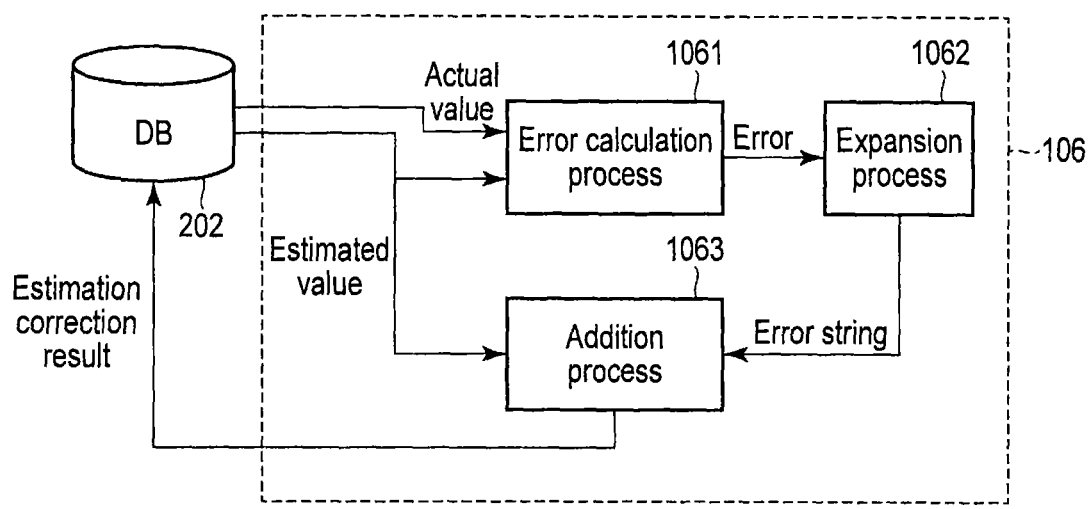
FIG. 11 is a view showing an example of the relationship between processes in an estimation unit 106.

FIG. 11 is a view showing an example of the relationship between processes in the estimation unit 106. An error calculation process 1061 acquires an actual value and estimated value of the power demand (or received power amount) from the database unit 202, and calculates an error at the present time. An expansion process 1062 expands this error into values at individual times. The expanded error string can be, e.g., an array in which errors at the present times are arranged by the same value, but is not limited to this.

An addition process 1063 acquires the error string from the expansion process 1062, and acquires the estimated value from the database unit 202. The addition process 1063 adds the error string to the estimated value, and stores the obtained value as an estimation correction result in the database unit 202.

Figure 12:
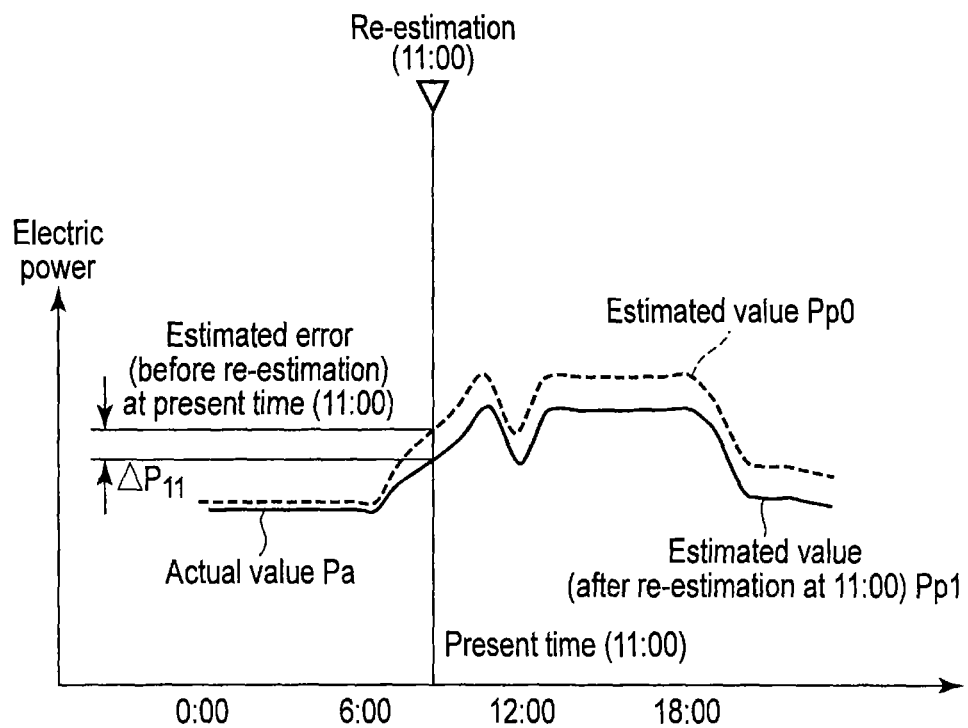
FIG. 12 is a view for explaining the effect of a re-estimation process.

FIG. 12 is a view for explaining the effect of the re-estimation process. A graph shown in FIG. 12 indicates an estimated value and actual value of the power demand on one day. There is an error between an estimated value Pp0 and actual value Pa. If the error exceeds the re-planning threshold, the re-planning process is executed. Letting $\Delta P11$ be an error at present time 11:00, a new estimated value Pp1 can be obtained based on:

$$Pp1 = Pp0 + \Delta P11 \qquad (2)$$

By this re-planning process, the estimated error at 11:00 becomes 0.

Figure 13:
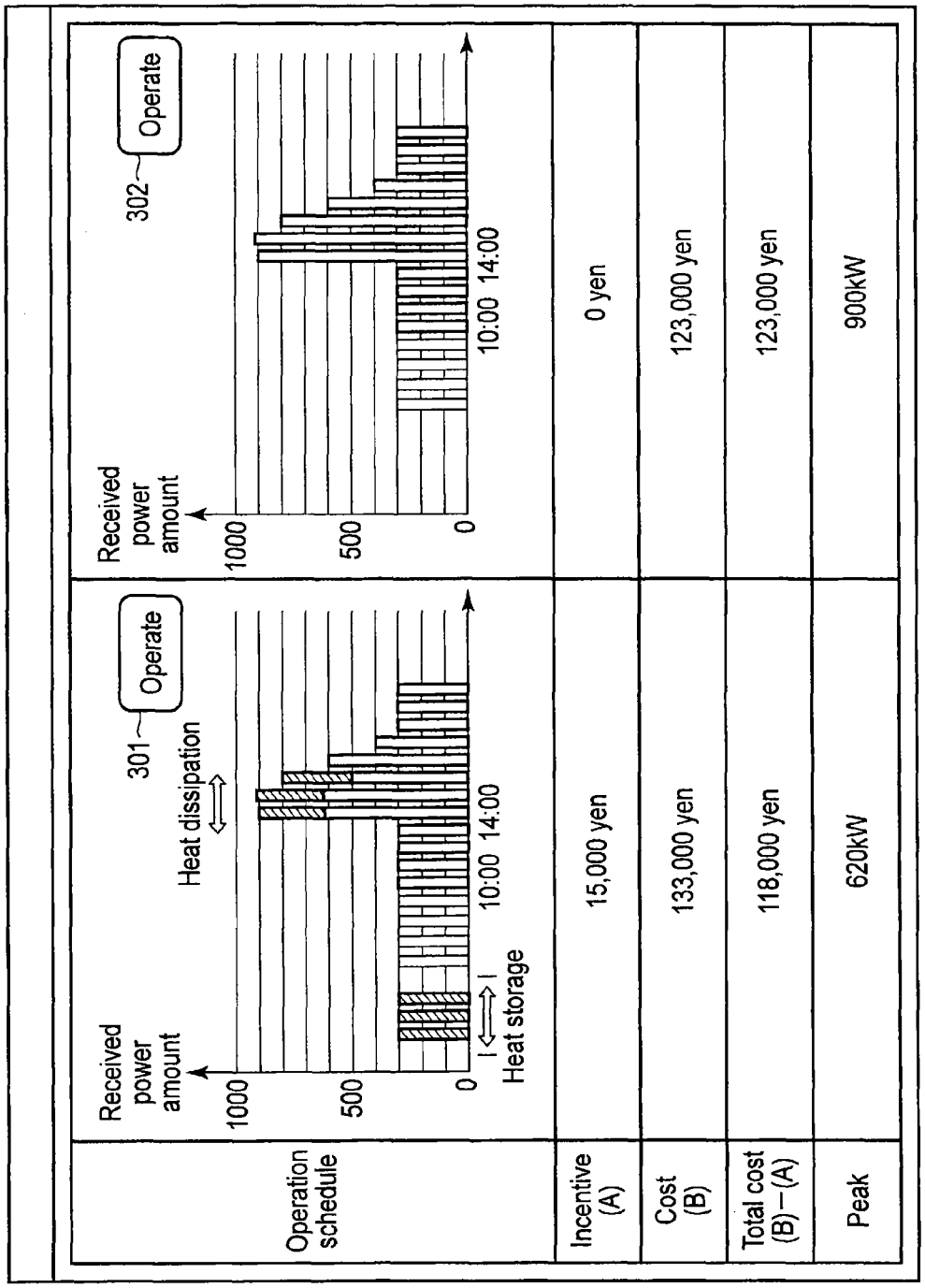
FIG. 13 is a view showing an example of a window displayed on a display 42.

FIG. 13 is a view showing an example of a window displayed on the display 42. This window is displayed on the display 42 in step S7 of FIG. 5 in order to urge the user to approve an operation schedule. For example, different operation schedules are displayed on the right and left sides of the window. An operation button 301 is displayed in the operation schedule on the left side. An operation button 302 is displayed in the operation schedule on the right side.

The left-side operation schedule indicates an operation schedule stored in the database 202b. The right-side operation schedule indicates an operation schedule stored in the database 202a. That is, the schedule displayed on the left side indicates an operation schedule created by the scheduling unit 105 when DR is received.

An incentive, cost, total cost, and peak power are displayed for each operation schedule. The operation schedule indicates the relationship between the received power amount and the heat storage and heat dissipation energy amounts.

The schedule on the left side of FIG. 13 shows that an incentive of 15,000 yen can be received by performing heat storage and heat dissipation, but the cost is 133,000 yen, so the total cost is 118,000 yen. The schedule on the right side shows that neither heat storage nor heat dissipation is performed based on a DR signal, so the total cost is 123,000 yen.

To give priority to cost reduction, the user need only select the left-side schedule. Therefore, the user can convey his or her intention to the system by clicking the operation button 301. Consequently, control based on the operation schedule taking account of DR is started.

Note that the peak of the received power amount for each schedule is also displayed. The peak power of the left-side schedule is 620 kW, and that of the right-side schedule is 900 kW. These numerical values can be used for reference in a case in which the received power amount is restricted. Note that the cost and peak power displayed in FIG. 13 are values supposed in a case where the operation schedule is executed (i.e., values calculated by the scheduling unit 105).

In the embodiment as described above, the error between the actual value and estimated value is calculated. If this error becomes equal to or larger than the preset threshold, a trigger for executing re-estimation of the demand and re-planning of the operation schedule is generated. The user can freely set the error by using the interface as shown in FIG. 8.

The sensitivities of the estimation process and planning process can be increased by setting a small value as the error in a desired period. This makes it possible to prepare an accurate operation schedule before a DR signal comes.

Also, in this embodiment, a trigger is generated based on the presence/absence of a demand response signal as well. In addition, the threshold is variably set even in the DR period. These features make it possible to finely follow information and requirements contained in the demand response signal, and create an advantageous operation schedule.

That is, in the embodiment, it is possible to rapidly review the operation schedule when a DR (Demand Response) signal is received. By immediately recalculating the operation schedule, it is possible to review estimation and perform re-planning in accordance with an error (the power demand or received power amount) immediately after the DR signal is received. Accordingly, an accurate operation schedule can rapidly be executed.

From the foregoing, it is possible to provide an energy management server, energy management method, and program capable of creating an accurate operation schedule with respect to a demand response signal.

Note that the present invention is not limited to the above-mentioned embodiment. For example, at least one of the DR accepting unit 101, monitoring unit 102, DR formulation unit 103, acquisition unit 104, scheduling unit 105, estimation unit 106, weather data receiving unit 107, transmission unit 108, approval unit 109, and determination unit 110 can also be implemented as a function of the cloud 9. Programs for implementing the functions of these functional blocks may be installed in a single computer, and may also be distributed to and installed in a plurality of computers. How to implement these functional objects in the system will readily be understood by those skilled in the art.

While certain embodiments of the inventions have been described, these embodiments have been presented by way of examples only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The appended claims and their equivalents are intended to cover such forms or modifications as would fall within the scope and spirit of the inventions.

What is claimed is:

1. An energy management server comprising:
   an estimation unit configured to calculate an estimated value of an energy demand in a building in which an electric appliance is installed;
   a scheduler configured to create an operation schedule of the electric appliance based on the estimated value;
   an acquisition unit configured to acquire an actual value of the energy demand;
   a monitoring unit configured to monitor an error between the estimated value and the actual value;
   a receiving unit configured to receive a demand response signal containing information which prompts suppression of energy consumption in a designated period; and
   a setting unit configured to set a threshold related to the demand response signal,
   wherein the estimation unit recalculates the estimated value if the error is equal or more than the threshold, and
   the scheduler reforms the operation schedule based on the recalculated estimated value.

2. The energy management server according to claim 1, wherein the threshold is variably set with respect to time.

3. The energy management server of claim 1, wherein the threshold is set lower in the designated period than that in other periods.

4. The energy management server of claim 1, further comprising a selection unit configured to select one of a power demand and a received power amount as the energy demand.

5. The energy management server of claim 1, further comprising a determination unit configured to determine whether to respond to the demand response signal.

6. An energy management method applicable to a server which manages energy in a building in which an electric appliance is installed, the method comprising, in the server,
   calculating an estimated value of an energy demand in the building,
   creating an operation schedule of the electric appliance based on the estimated value,
   acquiring an actual value of the energy demand, and
   monitoring an error between the estimated value and the actual value, wherein
   the calculating comprising recalculating the estimated value if the error is equal or more than a threshold set in association with a demand response signal containing information which prompts suppression of energy consumption in a designated period, and
   the creating comprising reforming the operation schedule based on the recalculated estimated value.

7. The energy management method of claim 6, wherein the threshold is variably set with respect to time.

8. The energy management method of claim 6, wherein the threshold is set lower in the designated period than that in other periods.

9. The energy management method of claim 6, wherein the server further selects one of a power demand and a received power amount as the energy demand.

10. The energy management method of claim 6, wherein the server further determines whether to respond to the demand response signal.

11. A non-transitory computer-readable medium storing a program executed by a computer, the program comprising:
    calculating an estimated value of an energy demand in a building in which an electric appliance is installed,
    creating an operation schedule of the electric appliance based on the estimated value,
    acquiring an actual value of the energy demand, and
    monitoring an error between the estimated value and the actual value, wherein
    the calculating comprising recalculating the estimated value if the error is equal or more than a threshold set in association with a demand response signal containing information which prompts suppression of energy consumption in a designated period, and
    the creating comprising reforming the operation schedule based on the recalculated estimated value.

12. The medium of claim 11, wherein the threshold is variably set with respect to time.

13. The medium of claim 11, wherein the threshold is set lower in the designated period than that in other periods.

14. The medium of claim 11, wherein the program further comprising selecting one of a power demand and a received power amount as the energy demand.

15. The medium of claim 11, wherein the program further comprising determining whether to respond to the demand response signal.

* * * * *